United States Patent [19]

Kazlauskas

[11] 4,408,112
[45] Oct. 4, 1983

[54] WELDING INSERT RING AND METHOD OF WELDING THEREFOR

[76] Inventor: Gasparas Kazlauskas, 4455 Los Feliz, Apt. 1108, Los Angeles, Calif. 90027

[21] Appl. No.: 273,206

[22] Filed: Jun. 12, 1981

[51] Int. Cl.³ .......................... B23K 31/06; B23K 9/02
[52] U.S. Cl. ................................. 219/61; 219/137 R; 285/286
[58] Field of Search .................... 219/160, 61, 137 R; 285/286, 22, 21, 398, 419; 428/582, 599

[56] References Cited

U.S. PATENT DOCUMENTS

| | | | |
|---|---|---|---|
| 1,332,186 | 2/1920 | Fay | 219/137 R |
| 1,630,037 | 5/1927 | Stresau | 285/286 X |
| 2,009,744 | 7/1935 | Pfefferle | 285/286 X |
| 2,409,865 | 10/1946 | Jewell | 285/22 |

*Primary Examiner*—M. H. Paschall
*Assistant Examiner*—C. M. Sigda
*Attorney, Agent, or Firm*—Jack C. Munro

[57] ABSTRACT

The method of and apparatus for welding of a pair of in-line pipes which utilizes a pair of insert rings. Initially, in the root area of the weld there is located an inner insert ring, which is welded to the pair of abutting pipes by a root welding path. An outer insert ring which is constructed of two identical pieces is located exteriorly about the inner insert ring between the pair of in-line pipes. The outer insert ring includes a laterally extending flange which is to be tack welded to the exterior surface of the pipe which is abuts. The main section of the outer insert ring is then melted to fuse together the pipes. The tack welding of the flange to the pipes keeps the main section of the outer insert ring located between the abutted edges of the in-line pipes.

9 Claims, 8 Drawing Figures

WELDING INSERT RING AND METHOD OF WELDING THEREFOR

BACKGROUND OF THE INVENTION

The field of this invention relates to welding and more particularly to the use of an insert ring to facilitate the welding of pipes in tight quartered situation.

Intricate arrangement of a large number of pipes of different diameters within facilities such as nuclear power plants, chemical plants, and similar facilities, requires special welding procedures because the space available for installing new pipes and/or repairing already constructed pipes is extremely limited. Previously, such limited space environments has been utilized with what has been commonly referred to as an insert ring within the welding area. The insert ring is located within the root area of the weld.

The use of this internal insert ring is helpful since the ring locates and maintains the pipes in a precise in-line position and spaced apart the precise amount in order to achieve the best possible weld. A root welding pass is performed which results in the pipes being secured together in the root area. The welding of the two pipes is then to be completed by utilizing conventional welding technique with filler wire or stick electrode. Normally, a plurality of welding passes are required until the welding recess is completely filled. Reference is to be had to U.S. Pat. No. 2,792,490, by Risch et al for a description of this internal insert However, in tight quartered situations, it is frequently difficult to complete the welding procedure because of the inaccessability of the welding environment. Because of the limited space, it is difficult to locate a welding head and associated filler wire in the welding area and then move the welding head and the filler wire three hundred and sixty degrees about the pipe.

There is a need for utilizing an improved technique for completing of a weld between a pair of aligned pipes which are located in a limited space environment.

SUMMARY OF THE INVENTION

The method and apparatus of the present invention relates to the utilizing of a second insert ring within a welding area of a pair of in-line pipes which are to be welded. The root areas of the pipes are welded together through the use of an inner insert ring initially positioned between the pipes in the root area. A root welding pass is performed thereby obtaining the root weld. Within the remaining welding cavity, there is to be located two halves of a split ring. The free ends of this split ring are to be connected together by tack welding. Each of the halves of the split ring have a laterally extending flange. The outer edge of this flange is to be attached to one of the aligned pipes by a continuous three hundred and sixty degree weld bead. The main section of the outer insert ring is now melted, resulting in fusing of this main section to the pipes. No filler wire is required in the completing of the weld.

The primary objective of this invention is to utilize a method and an apparatus for welding of pipes or tubes located in tight quartered environments.

DETAILED DESCRIPTION OF THE SHOWN EMBODIMENT

Figure 1:
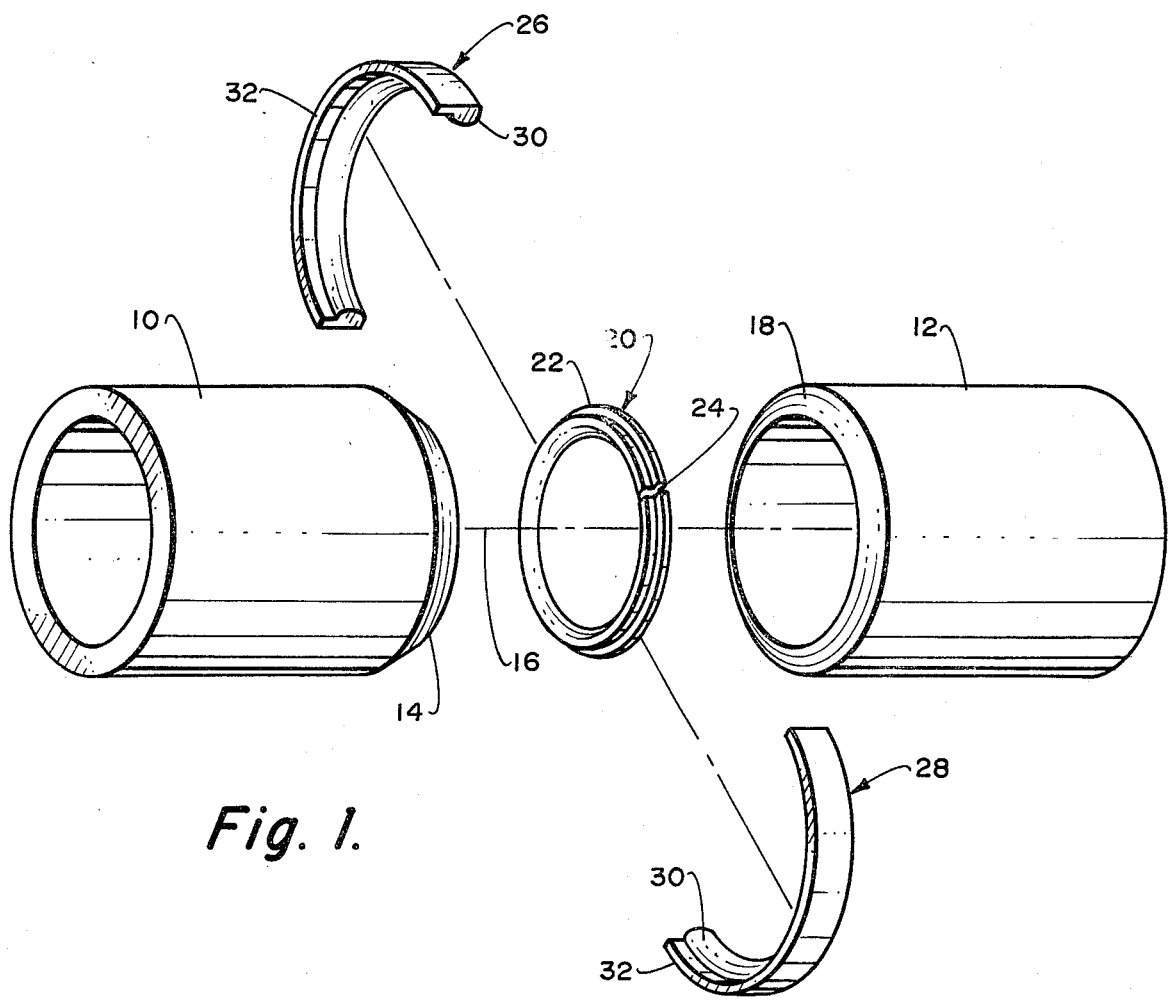
FIG. 1 is an exploded, isometric view showing a pair of pipes which are to be welded in an in-line relationship and both the inner and outer insert rings which are to be employed in order to achieve the welding of the pipes.

Referring particularly to the drawings, there is shown in FIG. 1 a first section of pipe 10 and a second section of pipe 12. The end of the pipe 10 that is to be welded is formed into a chamfered section 14. Preferably, this chamfered section 14 is angled (at approximately thirty seven degrees) in respect to a plane located perpendicular to the longitudinal center axis 16 of the pipe 10. Similarly, a chamfer 18 is formed on the free end of the pipe 12. The pipes 10 and 12 are to be connected together in a substantially abutting relationship with their longitudinal axes coinciding, as is represented within the drawings.

Located between the pipes 10 and 12 is an inner insert ring 20. The inner insert ring 20 has an annular centrally located protuberance 22. Pipe 12 is to abutt one side of the protuberance 22, with the pipe 10 abutting the other side of the protuberance 22, as is substantially shown within FIG. 3 of the drawings. As can be readily seen, the ring 20 functions to maintain the pipes 10 and 12 in an in-line relationship. The structure of the ring 20 is deemed to be conventional and will be normally constructed of a metallic material, such as stainless steel. It is to be noted that in the manufacture of the ring 20, there is produced a small slit 24 due to the abutting ends of the ring 20.

Figures 2, 3:
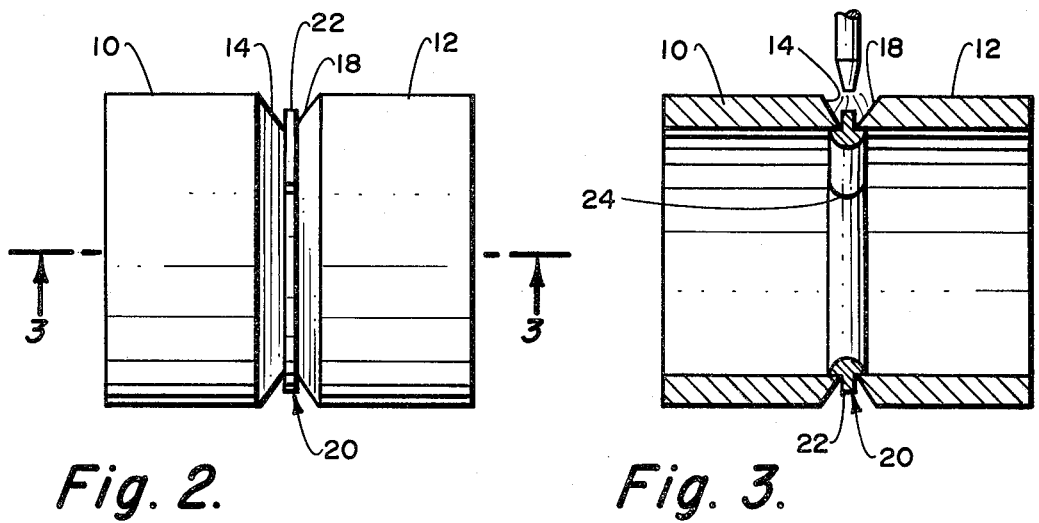
FIG. 2 is a longitudinal, elevational view showing a pair of pipes with the conventional root insert ring mounted therebetween.
FIG. 3 is a cross-sectional view taken along line 3—3 of FIG. 2.
Figure 4:
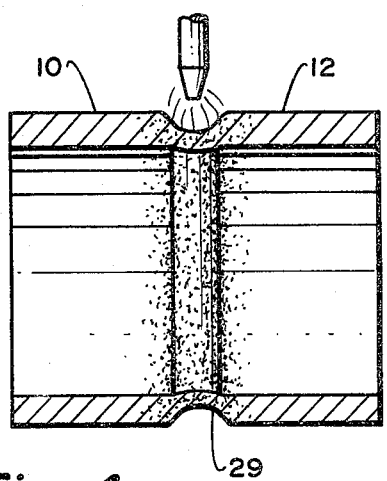
FIG. 4 is a view similar to FIG. 3 after the performing of the root welding pass.

After the insert ring is located as shown in FIG. 3, there is performed a root welding pass which results in a fusing in the root area of the sections of pipe 10 and 12. This is represented in FIG. 4 of the drawings.

Figure 5:
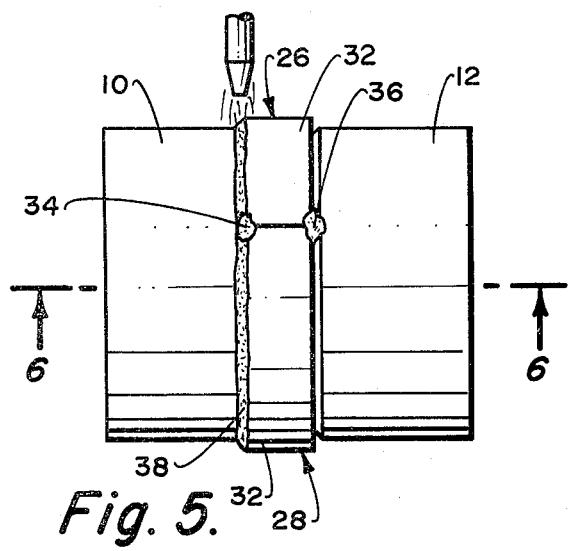
FIG. 5 is a longitudinal, elevational view showing the outer insert ring mounted in position within the welding recess formed exteriorly of the root weld joining the pipes of FIG. 4.
Figure 6:
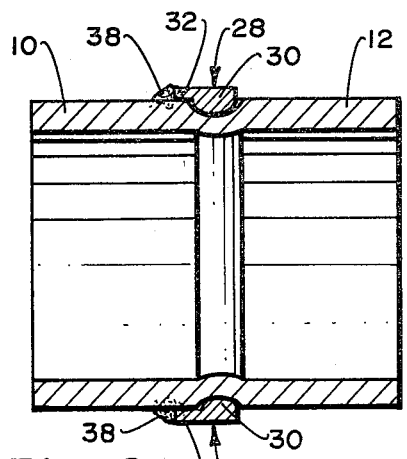
FIG. 6 is a cross-sectional view taken along line 6—6 of FIG. 5.

The operator then proceeds to locate identical ring sections 26 and 28 within the welding area 29. This is shown in FIGS. 5 and 6 of the drawings.

Each of the ring sections 26 and 28 include a main enlarged section 30 from which there extends laterally a flange 32. The main enlarged sections 30 are to be located within the welding area 29. When the main enlarged sections 30 are so located, the flanges 32 abutt against the exterior surface of the pipe 10.

The operator then completes tack welds 34 and 36 one hundred and eighty degrees from each other to connect together ring sections 26 and 28 of the outer insert ring assembly. It is to be understood that similar tack welds (not shown) would be utilized diametrically opposite the tack welds 34 and 36 to secure the other unattached ends of the ring sections 26 and 28.

The operator then proceeds to engage the welding head to make a continuous welding pass securing the flange 32 to the pipe 10. This welding pass is represented by weld bead 38. The position of the ring sections 28 and 26 with respect to the welding area 29 has now been fixed and will prevent any distortion of ring sections 26 and 28 while being subsequently welded.

Figure 7:
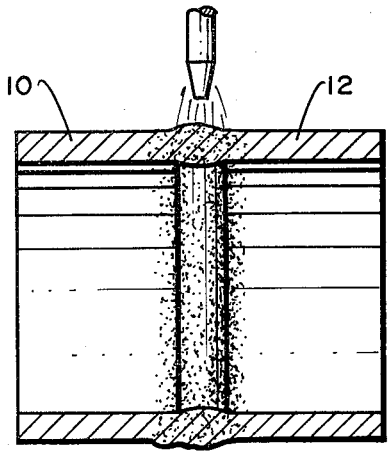
FIG. 7 is a view similar to FIG. 6 after the performing of the melting and fusing of the outer insert ring to the pipes.

A welding pass is now performed upon the main sections 30 of the ring sections 26 and 28. This results in the ring sections 26 and 28 being melted, fusing the pipes 10 and 12. Also, the flange 32 is substantially melted. This is represented diagramatically within FIG. 7.

It is to be noted that if it were not for the welding (weld bead 38) of the flange 32, that there would be a natural tendency for the portion of the ring sections 26 and 28 that is located directly adjacent the welding to bend or deflect out of the welding area 29. This is clearly not desirable, since it is necessary to maintain the ring sections 26 and 28 within the welding area. It is for this reason that the welding of the flange 32 to the pipe 10 is required. This tack welding of flange 32 prevents the outward movement of the ring sections 26 and 28. It can be seen from FIG. 7 that as a result, the complete welding operation has produced a substantially continuous piping structure joining the pipes 10 and 12.

Figure 8:
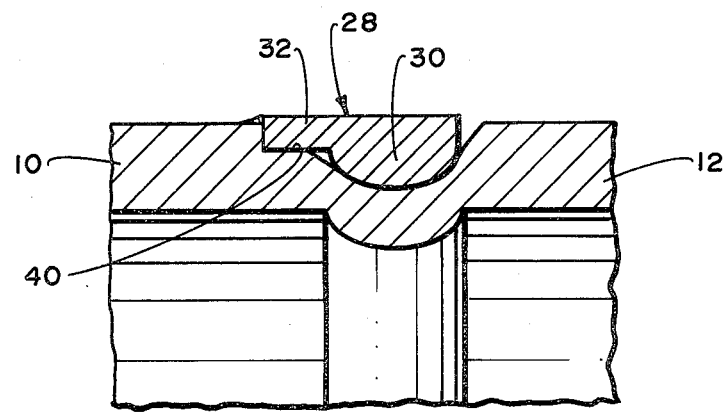
FIG. 8 is a segmental, cross-sectional view across the welding seam showing a modified form of outer insert ring of this invention.

Referring particularly to FIG. 8, there is shown a pair of pipes 10 and 12 substantially as shown in FIG. 6. There is one change, and that has to do with the forming within the pipe 10 in the area of the chamfer a ledge 40. This ledge 40 can be easily machined into the chamfer 14, if such is desired. The flange 32 is then to rest within the ledge 40. The welding of the flange 32, as well as the main section 30 is to occur in the manner as previously described. The main advantage of the structure of FIG. 8 over that of FIG. 6 is that in most instances, a smoother exterior weld bead is produced joining the pipes 10 and 12.

What is claimed is:

1. The method of welding abutting edges of a pair of in-line pipes comprising the steps of:
    locating an inner insert ring between said edges directly adjacent the interior surface of said pipes;
    performing a root pass weld of said inner insert ring to said pipes;
    locating an outer insert ring between said pipes and exteriorly of said inner insert ring;
    welding of said outer insert ring to one of said pipes; and
    performing a complete welding of said outer insert ring by fusing of said outer insert ring to said pipes.

2. The method of claim 1 wherein:
    constructing said outer insert ring of a plurality of separate members which are then located as a continuous single ring when positioned exteriorly of said inner insert ring; and
    between the locating and welding steps there occurs the additional step of tack welding said separate members together.

3. The method of claim 2 wherein the step of constructing includes forming said outer insert ring of two identically sized parts.

4. The method as defined in claim 2 wherein the step of constructing includes forming an annular flange extending laterally from said outer insert ring and the step of welding comprising the fusing of said annular flange to one of said pipes.

5. The method as defined in claim 4 including forming an annular groove within said one of said pipes, said flange to be located within said groove.

6. In combination with a pair of in-line substantially abutting pipes, an insert ring to facilitate the welding together of said pair of in-line substantially abutting pipes, said in-line pipes forming an annular recess at their abutted ends, said insert ring comprising:
    a main section to be located within said annular recess; and
    a flange extending from said main section, said flange being substantially equal to the length of said main section, said flange to be located against the exterior surface of one of said pipes, said flange is to be welded to said one of said pipes and then said main section is to be melted to fill said annular recess thereby welding together said pipes.

7. The combination as defined in claim 6 wherein:
    said main section being constructed of two separate parts, said two separate parts to be joined together after being located within said annular recess.

8. The combination as defined in claim 7 wherein:
    said two separate parts being identical.

9. The combination as defined in claim 7 wherein:
    an annular groove being formed within one of said pipes directly adjacent said annular recess, said flange to be located within said annular groove.

* * * * *